(12) United States Patent
Hoeper et al.

(10) Patent No.: US 9,744,955 B1
(45) Date of Patent: Aug. 29, 2017

(54) TOWBAR ACTIVATED BRAKE SYSTEM HAVING DIFFERENTIAL ROTATION CAPABILITY

(71) Applicant: FAST GLOBAL SOLUTIONS, INC., Glenwood, MN (US)

(72) Inventors: John H. Hoeper, Alexandria, MN (US); Bryan D. Bosek, Glenwood, MN (US)

(73) Assignee: FAST Global Solutions, Inc., Glenwood, MN (US)

( * ) Notice: Subject to any disclaimer, the term of this patent is extended or adjusted under 35 U.S.C. 154(b) by 46 days.

(21) Appl. No.: 15/000,496

(22) Filed: Jan. 19, 2016

Related U.S. Application Data (60) Provisional application No. 62/105,049, filed on Jan. 19, 2015.

(51) Int. Cl.
*B60T 11/04* (2006.01)
*B60T 1/04* (2006.01)

(52) U.S. Cl.
CPC .............. *B60T 11/04* (2013.01); *B60T 1/04* (2013.01)

(58) Field of Classification Search
CPC . B61H 12/02; B60T 11/04; B60T 1/04; B62B 5/04; B62B 5/0485
USPC ................ 88/112 R, 19, 29, 34, 9
See application file for complete search history.

(56) References Cited

U.S. PATENT DOCUMENTS

| | | | |
|---|---|---|---|
| 2,149,624 A | 3/1939 | Owen | |
| 2,350,624 A * | 6/1944 | McDaniel | B62D 53/0864 16/35 D |
| 2,591,524 A | 4/1952 | Douglas et al. | |
| 2,639,785 A * | 5/1953 | Vickers | B60T 1/04 188/29 |
| 3,117,654 A * | 1/1964 | Henriksson | B60T 1/04 188/29 |
| 3,313,378 A | 4/1967 | Freeman et al. | |
| 3,948,544 A | 4/1976 | Presley et al. | |
| 4,949,986 A * | 8/1990 | Gohier | B60D 1/00 280/410 |
| 4,986,596 A | 1/1991 | Gohier | |
| 5,390,942 A | 2/1995 | Schuster et al. | |
| 5,531,295 A | 7/1996 | Kopman et al. | |
| 6,508,479 B1 * | 1/2003 | Tseng | B62B 3/007 188/21 |
| 8,061,489 B1 | 11/2011 | Lavens | |
| 2002/0175496 A1 * | 11/2002 | Novakowski | B65F 3/005 280/504 |
| 2004/0238290 A1 | 12/2004 | Brown | |
| 2006/0186625 A1 | 8/2006 | Terpsma et al. | |
| 2007/0163790 A1 | 7/2007 | Ryder et al. | |

(Continued)

OTHER PUBLICATIONS

Image of "TowBar Example", dated prior to Dec. 2014.

*Primary Examiner* — Melanie Torres Williams
(74) *Attorney, Agent, or Firm* — Chrisensen, Fonder, Dardi & Herbert PLLC (57) ABSTRACT

A tow bar-activated brake system capable of engaging two tires or tire sets of a dolly or trailer where the tires or tire sets are of substantially different diameter. The system includes a first brake assembly and second brake assembly commonly actuated yet capable of rotating independently of each other to provide engagement with both tires/tire sets, even when the tires/tire sets are of substantially different diameter, for example due to uneven wear.

20 Claims, 9 Drawing Sheets

(56) References Cited

U.S. PATENT DOCUMENTS

2013/0334783 A1* 12/2013 Carruyo .................... B60P 7/08
 280/79.11
2016/0185373 A1* 6/2016 Tofflemire ................ B62B 3/04
 280/493

* cited by examiner

TOWBAR ACTIVATED BRAKE SYSTEM HAVING DIFFERENTIAL ROTATION CAPABILITY

RELATED APPLICATIONS

This application claims the benefit of U.S. Provisional Patent Application No. 62/105,049, filed Jan. 19, 2015, the disclosure of which is hereby incorporated by reference in its entirety.

FIELD OF THE DISCLOSURE

The present disclosure is directed generally to brake systems for trailers and towed vehicles, and more specifically to tow bar actuated brake systems.

BACKGROUND

Towed vehicles are often used as ground support equipment for aircraft. Examples include baggage carts, mail carts, dollies, and supply trailers. The towed vehicles often include brake systems that are designed to engage the tread of the vehicle tires to provide braking when the towed vehicle is in a parked configuration. Many such brake systems are designed to engage two of the vehicle tires to provide stability by maintaining the orientation of the vehicle in the parked orientation.

It has been reported that some vehicles utilizing such brake systems become unstable in the parked configuration. This has resulted in the vehicle spuriously rotating about one of the braked tires and colliding with adjacent objects. The collisions can lead to expensive repairs, particularly when involving an aircraft.

An improved brake system that reduces or eliminates instabilities of parked vehicles would be welcomed.

SUMMARY

Various embodiments of the disclosure include a brake system that assures stabilization of a parked trailer or vehicle by compensating for different tire diameters that arise, for example, due to uneven tire wear. The disclosed embodiments accomplish the braking of the tires passively or automatically upon raising of the tow bar of the vehicle from a towing configuration to a parking configuration. Some embodiments also include a latching system that secures the tow bar in the parking configuration. Also, various embodiments include an actuation mechanism that is centrally located beneath the trailer bed, thereby reducing susceptibility to becoming accidentally ensnared during vehicle operation.

Many conventional braking systems operate by engaging the tread of two tires or two tire sets of a towed vehicle (e.g., the rear tires of a 4-wheel trailer). For various reasons, a condition can develop where the tires of towed vehicle experience differential tread wear, wherein a first of the braked tires or tire sets has worn to an effective diameter that is substantially different from a second of the braked tires or tire sets. For example, one of the braked tires or tire sets may become irreparably damaged and require replacement, while the remaining of the braked tires or tire sets is left on the vehicle to continue service. Often, the replaced tire or tire set has a different degree of tread wear than the remaining tire or tire set, thereby causing differing effective diameters between the braked tires.

Many conventional towed vehicles include brake systems that do not accommodate differing effective diameters of the braked tires. In instances where the difference between the diameters becomes large enough, certain conventional brake systems adequately engage one tire or tire set, but not the other, resulting in instability of the braked vehicle. That is, when in the parking configuration, the inadequately braked tire or tire set can pivot about the adequately engaged tire or tire set, for example due to gravity forces, wind, or the thrust of air commonplace on airport tarmacs due to the thrusting of prop or jet engines. The pivoting vehicle may collide with nearby objects, such as other ground support equipment or event aircraft. Various embodiments of the disclosure alleviate this problem by uniformly engaging the braked tires or tire sets, regardless of any diameter differences between the tire or tire sets that may exist.

Structurally, in various embodiments of the disclosure, a tow bar-activated brake system for a towed vehicle is disclosed, including a tow bar adapted to rotate from a towing configuration to a parking configuration. A first brake assembly includes a first axle defining a first rotation axis and a first brake bar offset from the first rotation axis for contacting a tread of a first tire of the towed vehicle, the first brake assembly being operatively coupled with the tow bar for rotation of the first axle about the first rotation axis. A second brake assembly includes a second axle defining a second rotation axis and a second brake bar offset from the second rotation axis for contacting a tread of a second tire of the towed vehicle, the second brake assembly being operatively coupled with the tow bar for rotation of the second axle about the second rotation axis. In some embodiments, the second rotation axis is concentric with the first rotation axis. In some embodiments, the second axle is configured for rotation about the second rotation axis independent of the first axle.

In various embodiments of the disclosure, a method for braking a towed vehicle is disclosed, including: rotating a first axle of a first brake assembly through a first rotational displacement and into contact with a tread of a first tire of a towed vehicle; and rotating a second axle of a second brake assembly through a second rotational displacement and into contact with a tread of a second tire of a towed vehicle, wherein the second rotational displacement is greater than the first rotational displacement.

DETAILED DESCRIPTION

Figures 1, 2:
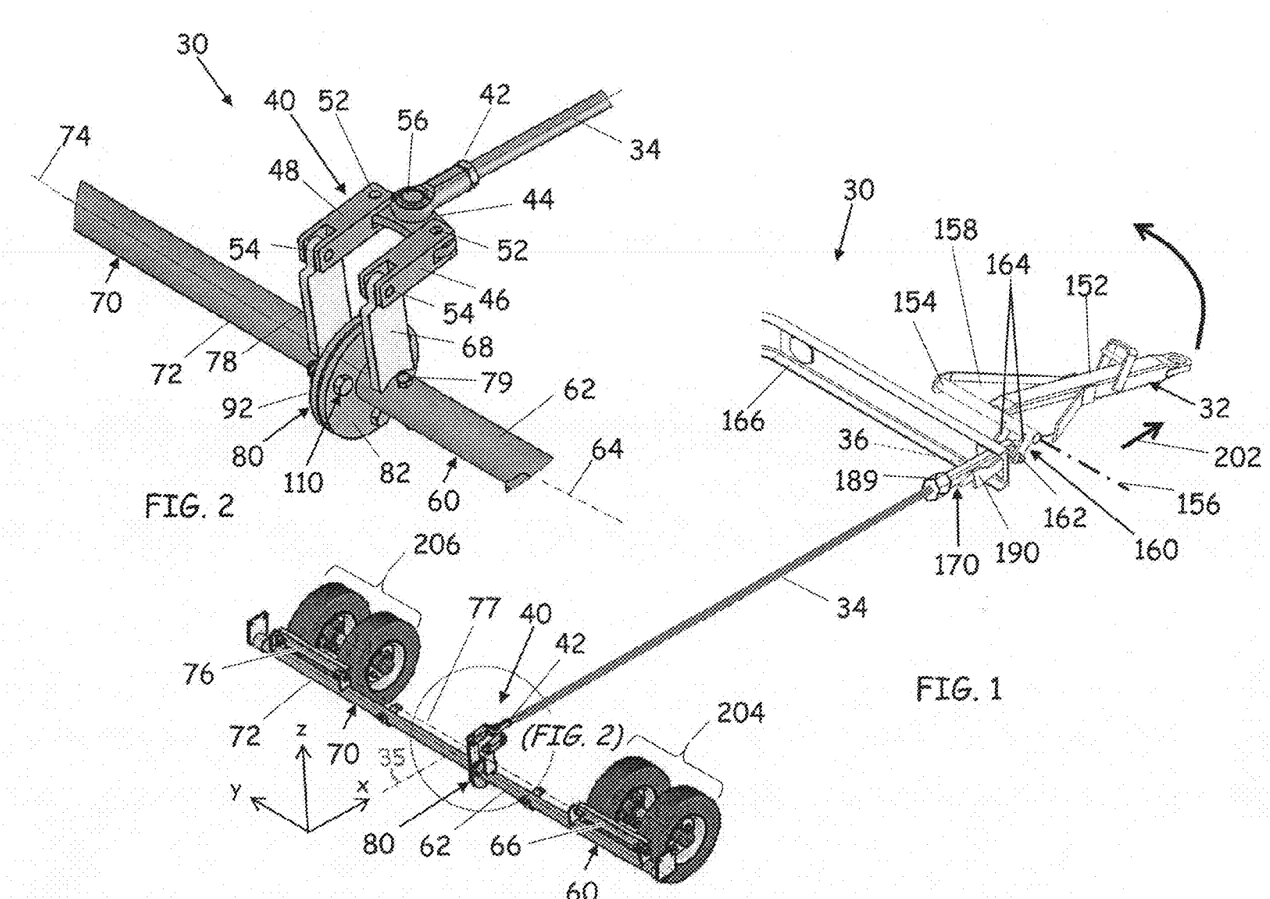
FIG. 1 is a perspective, partial cutaway view of a tow bar-activated brake system in an embodiment of the disclosure.
FIG. 2 is an enlarged, partial perspective view of the tow bar-activated brake system of FIG. 1 depicting a linkage assembly in an embodiment of the disclosure.

Referring to FIGS. 1 through 5, a tow bar-activated brake system 30 is depicted in an embodiment of the disclosure. The tow bar-activated brake system 30 includes a tow bar assembly 32 adapted to pivot from a towing configuration to a parking configuration. The depiction of FIG. 1 presents brake system in the towing configuration, wherein the brake system is in a non-braking configuration. The parking configuration is depicted schematically at FIG. 10, described in detail below.

A tie rod 34 includes a first end 36 coupled to the tow bar assembly 32, the tie rod 34 defining an actuation axis 35 of the tow bar-activated brake system 30. A linkage assembly 40 is pivotally connected to a second end 42 of the tie rod 34, the linkage assembly 40 including a cross member 44, a first linkage 46, and a second linkage 48. The forward ends of the linkages 46 and 48 are mounted to the cross member 44 about vertical pivots 52. The cross member 44 may be rotatable about a cross member pivot 56 that also extends vertically. In some embodiments, the rearward ends of the linkages 46 and 48 include horizontal pivots 54. In various embodiments, the pivots 52, 54, 56 include pins or rods that span end slots formed at the ends of the linkages 46 and 48. The pins or rods may be coupled to bushings (not depicted) disposed in the linkages 46, 48 and tie rod 34.

The depicted embodiment includes a first brake assembly 60 including a first axle 62 defining a first rotation axis 64 and a first brake bar 66 offset from the first rotation axis 64. The first linkage 46 of the linkage assembly 40 is operatively coupled with the first brake assembly 60, for example by a first standoff 68, for rotation of the first axle 62 about the first rotation axis 64. The depicted embodiment further includes a second brake assembly 70 including a second axle 72 defining a second rotation axis 74 and a second brake bar 76 offset from the second rotation axis 74, the second linkage 48 of the linkage assembly 40 being operatively coupled with the second brake assembly 70 for rotation of the second axle 72 about the second rotation axis 74, for example by a second standoff 78. In various embodiments, the first and second brake bars 66 and 76 are capable of being aligned along an offset axis 77. The first and second axles 62 and 72 can be of a hollow cylindrical structure, for example a schedule 80 pipe. In various embodiments, the first rotation axis 64 and the second rotation axis 74 are concentric.

The rotation of the second axle 72 is independent of the rotation of the first axle 62, so that the first and second brake assemblies 60 and 70 can undergo what is referred to herein as a "differential rotation." Differential rotation is established when one of the brake assemblies 60 or 70 ceases rotation due to set engagement with the respective tire/tire set 204 or 206, while the other of the brake assemblies 70 or 60 continues to rotate for lack of engagement with the respective tire/tire set 206 or 204. During actuation of the tow bar-activated brake system 30 differential rotation ceases when the other of the brake assemblies 70 and 60 is in set engagement with the other of the tire/tire sets 206 or 204.

Figures 2A, 4:
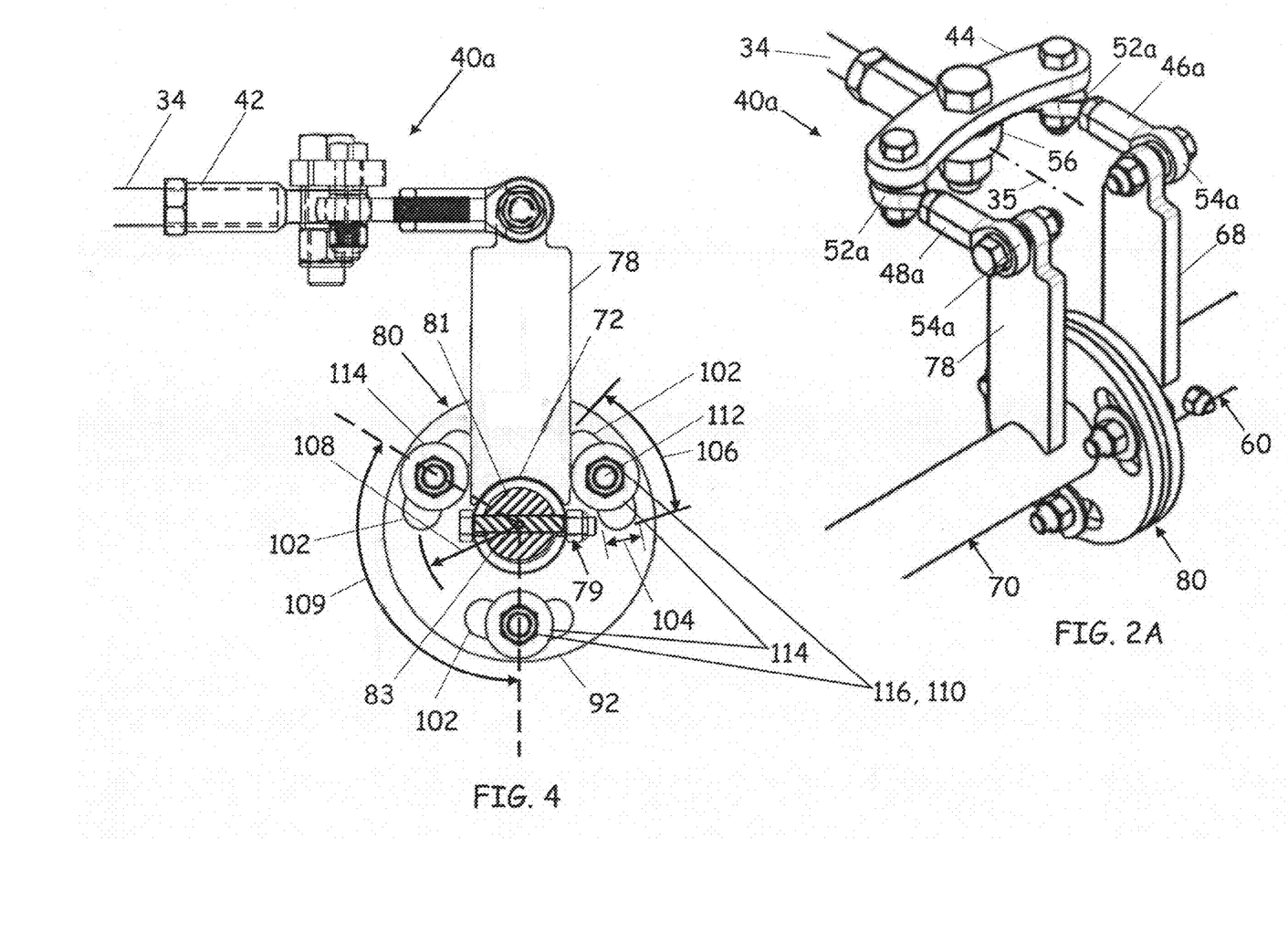
FIG. 2A is an enlarged, partial perspective view of an alternative linkage assembly in an embodiment of the disclosure.
FIG. 4 is an elevational view of the differential rotation joint of FIG. 3 in assembly with the linkage assembly of FIG. 2A.
Figure 3:
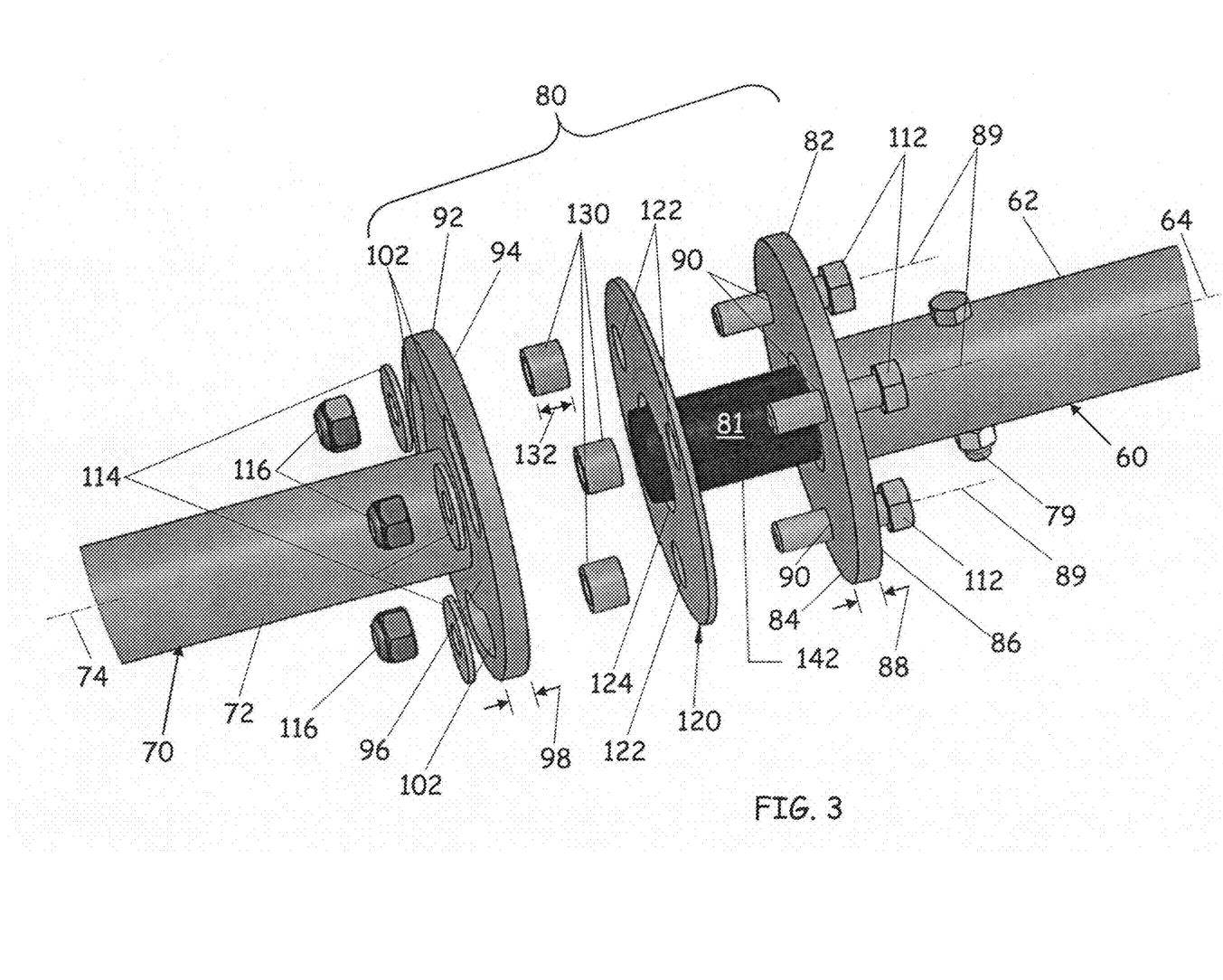
FIG. 3 is an exploded, partial view of the tow bar-activated brake system of including a differential rotation joint in an embodiment of the disclosure.

In reference to FIG. 2A, an alternative linkage assembly 40a is depicted in an embodiment of the disclosure. The linkage assembly 40a includes many of the same components and attributes as the linkage assembly 40, which are identified with same-numbered numerical references. Instead of the slotted bar linkages 46, 48, the linkages 46a and 48a include eyed ball joints 52a and 54a (known by the trade name HEIM joints) formed on opposing ends, the eyed ball joints 52a and 54a including a ball joint that defines an eye therethrough. Standard fasteners pass through the eyes of the eyed ball joints 52a and 54a to join the linkages 46a and 48a to the cross member 44 and the standoffs 68 and 78.

Functionally, the eyed ball joints 52a and 54a accommodate rotation of the forward ends of the linkages 46a and 48a toward the actuation axis of the tie rod 34. During a differential rotation between brake assemblies 60 and 70, the cross member 44 rotates about the pivot 56, such that both ends of the cross member 44 rotate towards the actuation axis 35. This cause the forward ends of both cross members 46a and 48a to also rotate toward the actuation axis 35. The differential rotation thereby reduces lateral distance (dimension in the y-direction of the x-y-z coordinate of FIG. 1) between the eyed ball joints 52a at the forward ends of the linkages 46a and 48a, while the lateral distance between the rearward ends of the linkages 46a and 48a remains fixed. The eyed ball joints 52a and 54a enable the linkages 46a and 48a to rotate without introducing slop or play in the assembly to accommodate the rotation.

In various embodiments, the first axle 62 and the second axle 72 are joined at a differential rotation joint 80. In one embodiment, the differential rotation joint 80 includes a centering shaft 81 disposed between the first axle 62 and the second axle 72, the centering shaft 81 being coupled to one of the first and the second axles 62 or 72, for example by a fastener 79 (depicted as coupled to the first axle 62 herein). In one embodiment, the fastener 79 is disposed through a lateral through-passage 83 that is defined as passing through both the first axle 62 and the centering shaft 81 (FIG. 4), thereby fixing the centering shaft 81 with respect to the first axle 62. The other of the first and second axles 62 or 72 rotates freely about the centering shaft 81.

In some embodiments, the first brake assembly 60 is connected to and in direct contact with the second brake assembly 70. In one embodiment, the differential rotation joint 80 includes a first flange 82 coupled to the first axle 62 and concentric about the first rotation axis 64 of the first axle 62. The first flange 82 includes an inner face 84 and an outer face 86 that defines a thickness 88 therebetween. The first flange 82 also defines circular through holes 90 that pass therethrough. The circular through-holes 90 may be defined along axes 89 that are substantially parallel to the first rotation axis 64.

In various embodiments, the differential rotation joint 80 includes a second flange 92 coupled to the second axle 72 and concentric about the second rotation axis 74 of the second axle 72. The second flange 92 includes an inner face 94 and an outer face 96 that defines thickness 98 therebetween. The second flange 92 is coupled to the first flange 82 and adapted to rotate about the second rotation axis 74 relative to the first flange 82. In the depicted embodiment, the second flange 92 defines arcuate slots 102, each arcuate slot 102 having a width 104 and an arcuate length 106. The arcuate slots 102 and the circular through-holes 90 are centered at a common radius 108 from the rotation axes 64, 74. Also, the arcuate slots 102 and the circular through-holes 90 are configured to be centered at common angular intervals 109 when the first and second brake bars 66 and 76 are in alignment along the offset axis 77.

In various embodiments, the first and second flanges 82 and 92 are coupled by fasteners 110, each fastener 110 including a bolt 112, a washer 114, and a nut 116. The bolts 112 pass through the circular through-holes 90 of the first flange 82 in a close tolerance or a press fit, and thus are in a substantially fixed rotational relationship with the first flange 82 of the first brake assembly 60. Alternatively, studs (not depicted) may be implemented that are welded to the inner face 84 of the first flange 82 and centered at the common angular intervals 109. The threaded ends of the bolts 112 also pass through the arcuate slots 102. In some embodiments, the bolts 112 are shoulder bolts, with the shoulder extending through the first flange 82, a shim 120 (when implemented), and at least a large fraction of the thickness 98 of the second flange 92. In some embodiments, the washers 114 are oversized in both thickness 117 and an outer diameter 118, the outer diameter 118 being substantially oversized with respect to the width 106 of the arcuate slots 102 (FIG. 4). In some embodiments, the washers 114 include a low friction and/or self-lubricating material, such as polytetrafluoroethylene (PTFE), NYLON®, or DELRIN®. In some embodiments, the self-lubricating material is a coating over a metallic washer substrate. Optionally, the washers 114 are formed of the self-lubricating material.

Optionally, the differential rotation joint 80 includes a spacer or shim 120 disposed interstitially between the first flange 82 and the second flange 92. In one embodiment, the shim 120 includes a low friction and/or self-lubricating material, such as PTFE, NYLON®, or DELRIN®. The shim 120 defines fastener apertures 122 for passage of the bolts 112 distributed about a center aperture 124 for passage of the centering shaft 81. Optionally, instead of a separate shim, one or both of the inner faces 84, 94 of the flanges 82, 92 may be provided with a lubricant. In other embodiments, instead of a shim, a thrust bearing (not depicted) is disposed interstitially between the first and second flanges 82 and 92.

In some embodiments, the differential rotation joint 80 includes bushings 130, each bushing 130 defining a length 132 and being concentric about a respective one of the bolts 112. Each bushing 130 rides within a respective one of the arcuate slots 102. In some embodiments, the bushings 130 include a low friction and/or self-lubricating material, such as polytetrafluoroethylene (PTFE), NYLON®, or DELRIN®. For example, the self-lubricating material may be a coating over a metallic bushing substrate. In various embodiments, each bushing 130 includes an inner metallic sleeve inserted within an outer self-lubricating sleeve, for example in a press fit arrangement. In some embodiments, the bushings 130 may be dimensioned to rotate about the bolts 112, with the inner diameter of the bushings 130 being lubricated, for example by a dry lubricant, to facilitate the rotation. In the latter embodiments, shoulder bolts used for the bolts 112 as described above provides a smooth surface to facilitate rotation of the bushings 130 about the bolts 112.

In assembly, the centering shaft 81 is inserted into the first axle 62 of the first brake assembly 60 and aligned so as to define the lateral through-passage 83, and the fastener 79 inserted therethrough and secured such that a protruding portion 142 of the centering shaft 81 protrudes from the first flange 82 of the first brake assembly 60. The center aperture 124 of the shim 120 is slid over the protruding portion 142 of the centering shaft 81 and the shim 120 rotationally oriented to that the fastener apertures 122 are substantially aligned with the circular through-holes 90 of the first flange 82. The second brake assembly 70 is slid over the protruding portion 142 of the centering shaft 81 so that the shim 120 is sandwiched between the first and second flanges 82 and 92. A clearance fit between the brake assembly 70 and the centering shaft 81 enables the brake assembly 70 to be rotated about the center shaft 81.

For the initial assembly of the differential rotation joint 80, the second brake assembly 70 may be rotated about the second rotation axis 74 so that the first and second brake bars 66 and 76 of the first and second brake assemblies 60 and 70 are aligned along the offset axis 77 (FIG. 1). With the brake bars so aligned, the circular through-holes 90 of the first flange 82 and the fastener apertures 122 of the shim 120 are substantially aligned with the center of the arcuate slots 102 of the second flange 92. The bolts 112 are fed through the aligned through-holes 90, fastener apertures 122, and arcuate slots 102. The bushings 130 are slid over the bolts 112, into the arcuate slots 102, and, if the fastener apertures 122 are sized to accommodate, into the fastener apertures 122 and registered against the inner face 84 of the first flange 82. The washers 114 are slid over the threaded ends of the bolts 112 (now protruding through the arcuate slots 102) and the nuts 116 threaded onto the bolts 112 to register the washers 114 against the outer face 96 of the second flange 92 and to couple the first brake assembly 60 to the second brake assembly 70.

The coupling of the first brake assembly 60 to the second brake assembly 70 must be such that the first brake assembly 60 can rotate independently of the second brake assembly 70. In some embodiments, to facilitate the independent rotation while still enabling lock tightening of the nuts 116 onto the bolts 112, the lengths 132 of the bushings 130 are dimensioned so that, in assembly, the bushings 130 protrude slightly proud with respect to the outer face 96 of the second flange 92. That is, the lengths 132 of the bushings 130 may be slightly greater than the combined thickness of the second flange 92 and shim 120. In such an embodiment, the nuts 116 are tightened onto the bolts 112 so that the washers 114 register against the bushings 130.

Figures 8A, 8B:
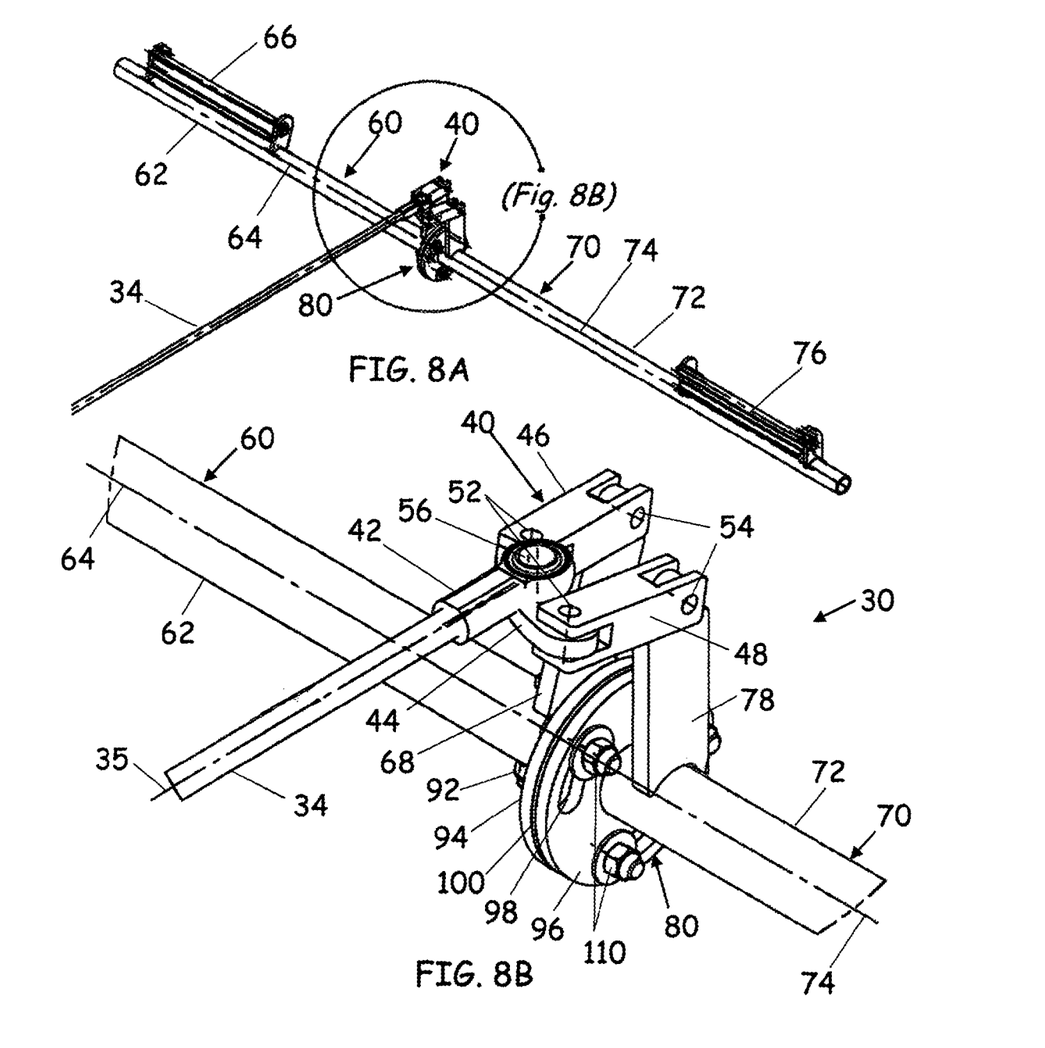
FIG. 8A is a partial perspective view of the tow bar-activated brake system of FIG. 1 depicting operation of a linkage assembly during differential rotation corresponding to FIG. 7 in an embodiment of the disclosure.
FIG. 8B is an enlarged perspective view of FIG. 8A.
Figures 9A, 9B:
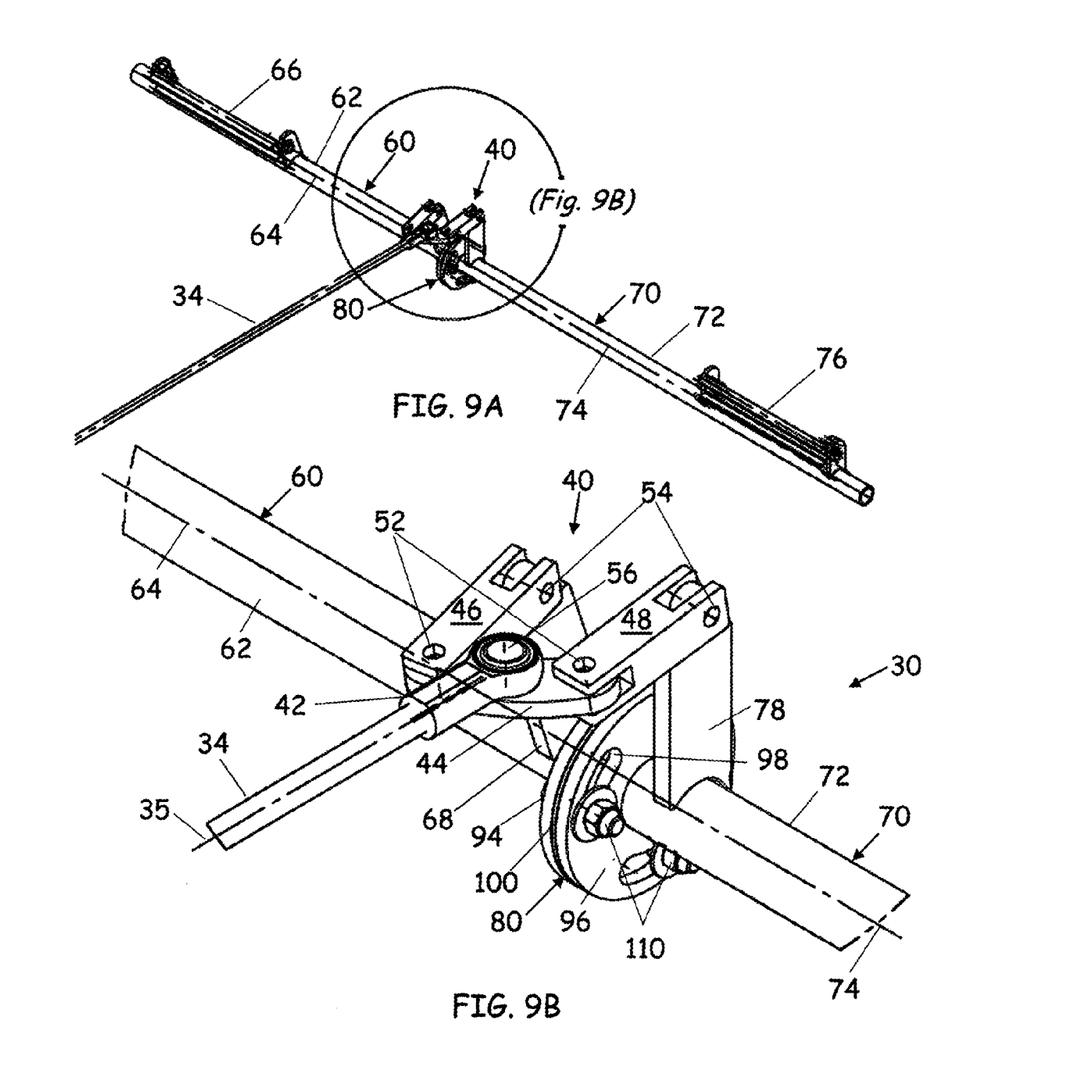
FIG. 9A is a partial perspective view of the tow bar-activated brake system of FIG. 1 in a compensating orientation in an embodiment of the disclosure.
FIG. 9B is an enlarged perspective view of FIG. 9A.

Functionally, the arcuate slots 102 enable the first flange 82 of the differential rotation joint 80 to rotate with respect the second flange 92. The fasteners 110 that are in substantially fixed relation with the first flange 82 can rotate within the arcuate slots 102, thus enabling rotation of the first flange 82 relative to the second flange 92. The rotational displacement of fasteners 110 within the arcuate slots 102 at respective extremes of rotational displacement is illustrated in FIGS. 8B and 9B. In this way, the first brake assembly 60 is able to rotate relative to the second brake assembly 70.

The centering shaft 81 provides stability and maintains alignment of the rotation axes 64, 74 at the joint between the first brake assembly 60 and the second brake assembly 70. The bushings 130 enable for sliding engagement with the arcuate slots 102 and, as discussed above, may provide the desired spacing between the washers 114 and the inner face 84 of the first flange 82. In this way, the nuts 116 and washers 114 can be drawn tight against the bushings 130 to securely register the bushings 130 against the inner face 84 of the first flange and to rotationally secure the nuts 116 to the threads of the bolts 112 while enabling the first brake assembly 60 to rotate independently of the second brake assembly 70. By having the bushing provide the desired clearance, assembly as well as field servicing of the tow bar-activated brake system 30 is simplified.

Returning to FIGS. 1 and 5, the tow bar assembly 32 includes a tongue 152 and a pivot member 154, the tow bar assembly 32 configured to pivot about a pivot axis 156 that passes through the pivot member 154. Gussets 158 may extend between the tongue 152 and the pivot member 154. In some embodiments, a yoke assembly 160 depends from the pivot member 154, the yoke assembly 160 including a yoke pin 162 supported by a pair of standoffs 164. The tow bar assembly 32 is pivotally mounted to a frame or carriage 166 of the towed vehicle.

Figure 5:
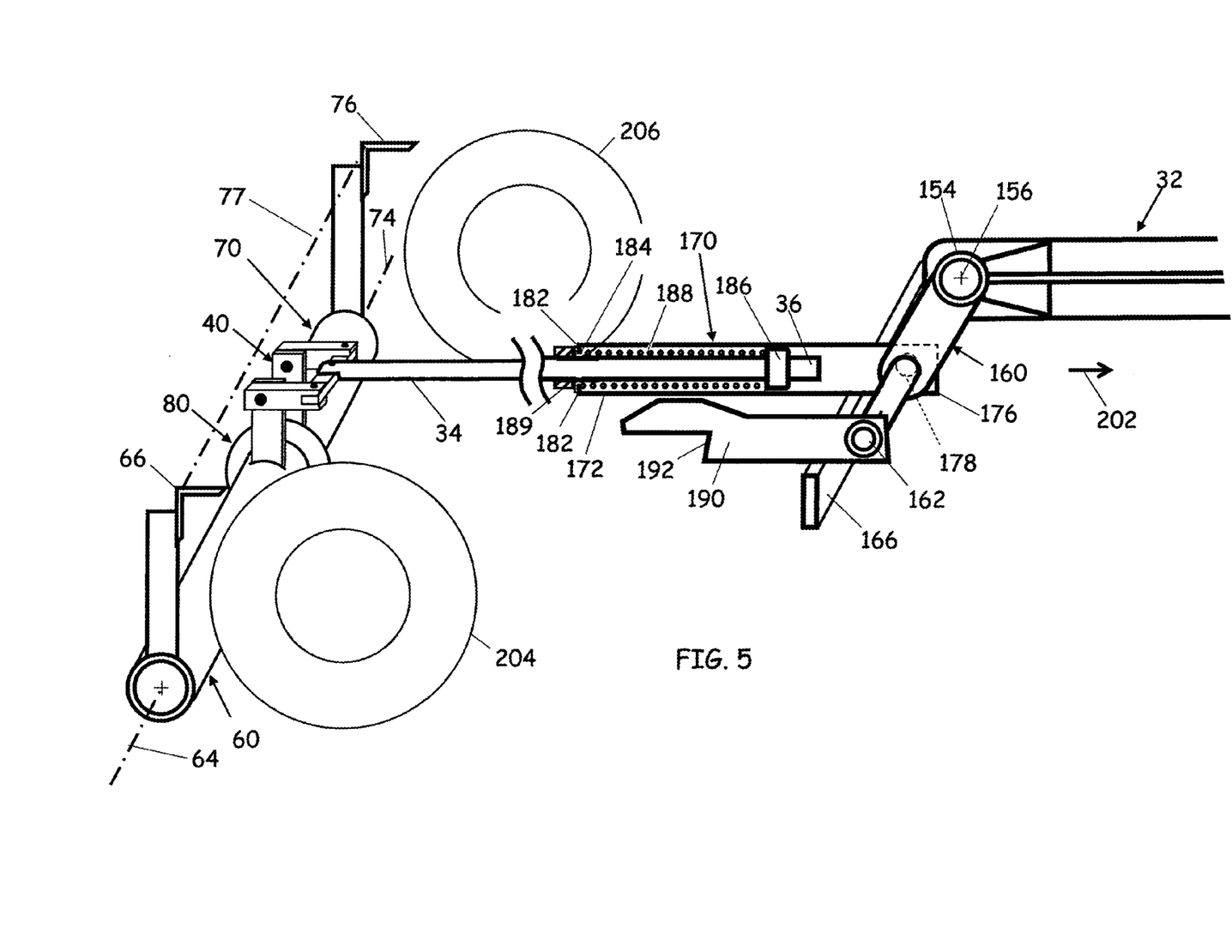
FIG. 5 is a schematic representation of the tow bar-activated brake system of FIG. 1 in an embodiment of the disclosure.

In various embodiments, a spring module 170 is coupled between the tow bar assembly 32 and the first end 36 of the tie rod 34, best seen in FIG. 5. In the depicted embodiment, the spring module 170 includes a housing 172 having a proximal end 174 and a distal end 176. A lateral passage 178 is defined near the distal end 176, through which the yoke pin 162 is disposed. The proximal end 174 of the housing 172 may include a reducing flange 182 defining an aperture 184 through which the tie rod 34 passes. In some embodiments, a head member 186 is coupled to the first end 36 of the tie rod 34, and a biasing element 188 disposed within the housing 172, the biasing element captured between the reducing flange 182 and the head member 186. The biasing element 188 may be, for example, a coiled spring (depicted) or an elastic bushing, such as a rubber or polymer material that is compressible yet resilient. In some embodiments, a stop 189 is affixed to the tie rod 34 rearward of the proximal end 174 of the housing 172.

In various embodiments, the tow bar assembly 32 includes a latch member 190 pivotally coupled to the yoke pin 162. The latch member 190 defines a notch or hook 192 configured to engage the frame 166 when the tow bar assembly 32 is in the parking configuration. In some embodiments, the latch member 190 is loosely coupled to the yoke pin 162, so as to pivot freely about the yoke pin 162 and rotate downward under force of gravity. In some embodiments, the yoke pin is biased to rotate into a latching position by a spring (not depicted) coiled about the yoke pin 162.

Figure 6:
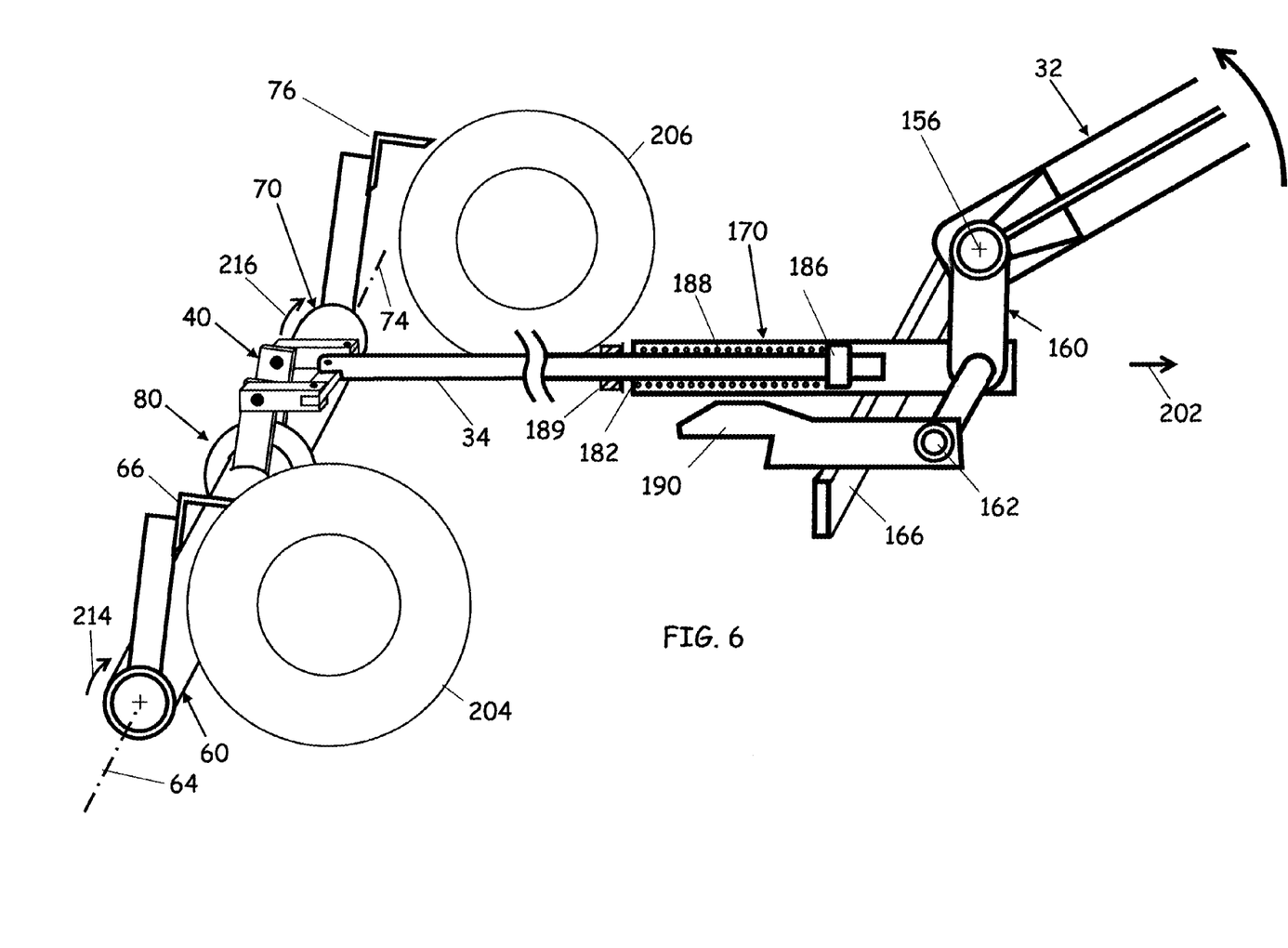
FIG. 6 is a schematic representation of the tow bar-activated brake system of FIG. 1 in initial engagement with a first tire in an embodiment of the disclosure.
Figure 7:
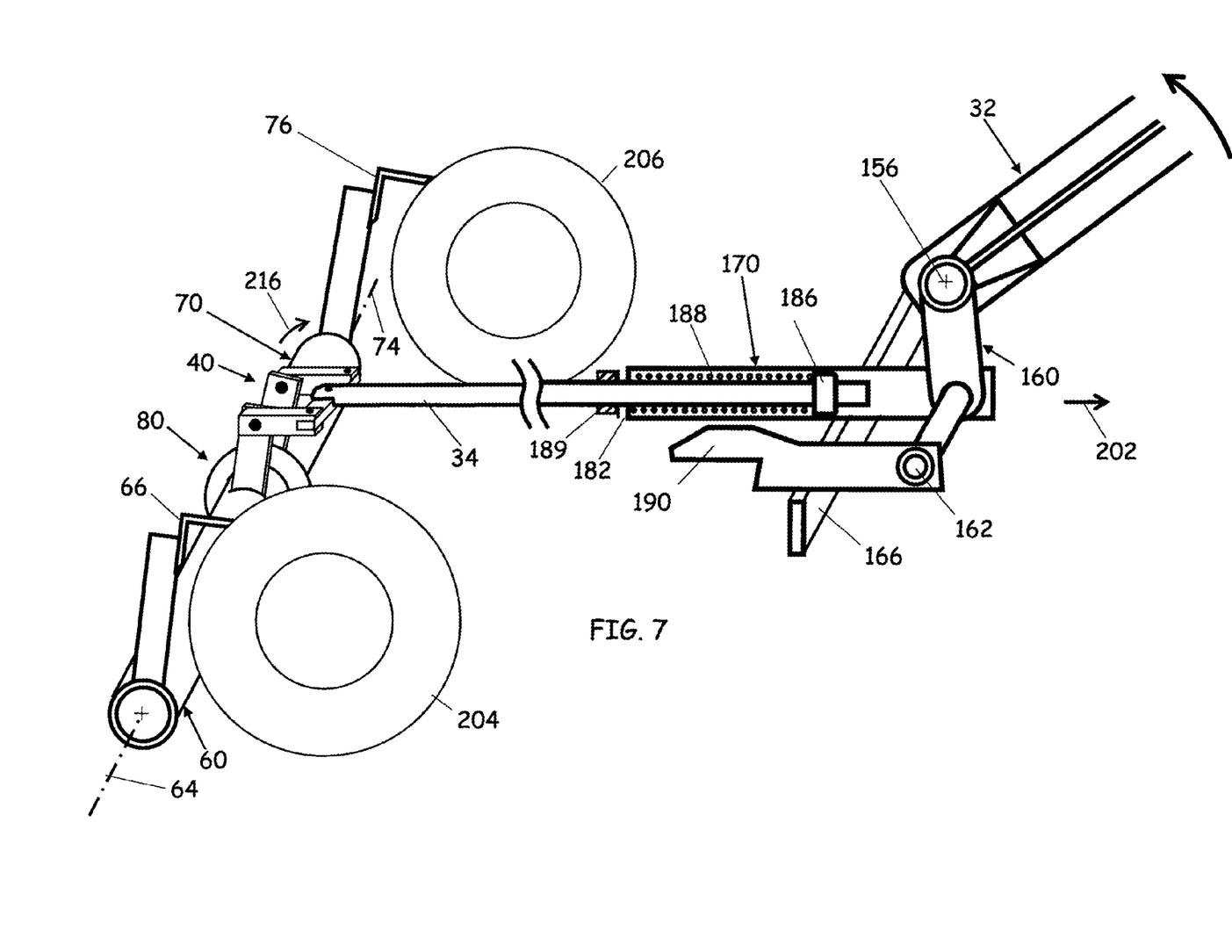
FIG. 7 is a schematic representation of the tow bar-activated brake system of FIG. 1 in engagement with both tires in an embodiment of the disclosure.

Referring to FIGS. 6 and 7, operation of the tow bar-activated brake system 30 is depicted in an embodiment of the disclosure. The FIGS. 6 and 7, as well as FIGS. 5 and 8, are a schematic representation of the tow bar-activated brake system 30, and as such depict certain components and attributes in simplified or exaggerated form to illustrate the operational concept. To set the brakes of the tow bar-activated brake system 30, the tow bar 32 is rotated from the towing configuration or a downward position (FIG. 6) into the parking configuration (FIG. 10), the tongue 52 of the tow bar 32 being pointed substantially upward in the parking configuration. Upon rotation of the tow bar 32 from the towing configuration toward the parking configuration, the off center rotation of the yoke assembly 160 about the pivot axis 156 translates the tie rod 34 along the actuation axis 35 in a forward or distal direction 202, translating the linkage assembly 40 therewith. The translation of the linkage assembly 40 exerts a forward force on the standoffs 68, 78, causing rotational displacements 214 and 216 of the first and second brake assemblies 60 and 70, respectively, about their respective rotation axes 64, 74. The rotational displacements 214, 216 cause the first and second brake bars 66 and 76 to rotate into contact with the treads of the respective first and second tires or tandem tire sets 204 and 206.

If one of the tires/tire sets 204 or 206 is of substantially larger effective diameter than the other of the tires/tire sets 206 or 204 (tire 204 in FIGS. 6 and 7), the respective one of the brake bars 66 or 76 (brake bar 66 in FIGS. 6 and 7) engages the corresponding tire/tire set 204 or 206 before the other of the brake bars 76 or 66 (brake bar 76 in FIGS. 6 and 7) engages the other tire/tire set 206 or 204. The rotational displacement 214 or 216 of the contacting brake bar 66 or 76 (rotational displacement 214 in FIG. 6) ceases as the brake bar 66 or 76 becomes set against the larger diameter tire/tire set 204 or 206.

As the tow bar 32 continues to rotate upwards, the stroke of the tie rod 34 in the forward direction 102 also continues, so that the other of the brake bars 76 or 66 (brake bar 76 in FIGS. 6 and 7) continues the rotational displacement 216 or 214 towards the respective tire/tire set 206 or 204, thus establishing a differential rotation. The rotational displacement 216 or 214 (rotational displacement 216 in FIG. 7) ceases as the other of the brake bars 76 or 66 becomes set against the respective tire/tire set 206 or 204 (FIG. 7). At this point, both tire/tire sets 204 and 206 are braked.

Referring to FIGS. 8A and 8B, the effect of the differential rotation on the linkage assembly 40 is depicted in an embodiment of the disclosure. The independent rotations of the first and second brake assemblies 60 and 70 are driven by the linkage assembly 40, which is pivotable about the cross member pivot 56. In the event of a differential rotation, the linkage assembly 40 pivots about the cross member pivot 56, thereby enabling rotation of one of the brake assemblies 60, 70 while the other of the brake assemblies 70, 60 remains rotationally stationary. The FIGS. 8A and 8B depictions present operation of the linkage assembly 40 as depicted in FIGS. 6 and 7, when the first tire/tire set 204 is of a larger diameter than the second tire/tire set 206. In this scenario, the first brake assembly 60 contacts with the first tire/tire assembly 204 before the second brake assembly 70 contacts the second tire/tire assembly 206, such that the second brake assembly 70 undergoes a larger rotational displacement to become seated with the treads of the second tire/tire assembly 206. The linkage assembly 40 pivots about the cross member pivot 56 in a first direction (clockwise in FIGS. 8A and 8B) to accommodate the differential rotation between the rotational displacements 214 and 216 of the first and second brake assemblies 60 and 70.

Referring to FIGS. 9A and 9B, operation of the linkage assembly 40 in an alternative to the scenario of FIGS. 6 and 7 is depicted in an embodiment of the disclosure. Here, the first brake assembly 60 undergoes a larger rotational displacement than does the second brake assembly 70, for example because the second tire/tire set 206 is of a larger diameter than the first tire/tire set 204. In this scenario, the second brake assembly 70 contacts with the second tire/tire assembly 206 before the first brake assembly 60 contacts the first tire/tire assembly 204, such that the first brake assembly 60 undergoes a larger rotational displacement to become seated with the tread(s) of the first tire/tire assembly 204. The linkage assembly 40 pivots about the cross member pivot 56 in a second direction (counterclockwise in FIGS. 9A and 9B) to accommodate the differential rotation between the first and second brake assemblies 60 and 70.

Referring to FIG. 10 and again to FIGS. 5 through 7, the operation of the spring module 170 and the latch member 190 are described. When tow bar 32 is down (FIG. 5), the yoke assembly 160 pushes the housing 172 of the spring module 170 against the stop 189 to rotate and/or maintain the brake bar 66 and 76 away from the treads of the tires/tire sets 204 and 206 in a disengaged position. In the FIG. 5 configuration, the biasing element 188 resides passively in the housing 172, without compression.

As the tow bar 32 is further rotated upward, the housing 172 of the spring module 170 is further translated in the forward direction 102 by the yoke assembly 160. As depicted in FIG. 6, the biasing element 188 in the housing 172, being pushed along by the reducing flange 182 of the spring module 170, is thereby pushed against the head member 186 affixed to the distal end 36 of the tie rod 34 to further translate the tie rod 34 in the forward direction 102. The translation of the tie rod 34 causes the further rotational displacements 214 and 216 of the brake assemblies 60 and 70 to pull the brake bars 66 and 76 toward the tire/tire sets 204 and 206. The rotational displacements 214 and 216 continue until at least one of the brake bars 66 and/or 76 register against the tire/tire sets 204 and/or 206 (FIG. 6). During the rotational displacements 214 and 216, the force exerted on the bias element 188 is only enough force to overcome the friction and other imperfections of the tow bar-activated brake system 30.

After engagement of a single brake bar 66 or 76 (brake bar 66 in FIG. 6) the other of the brake assemblies 70 or 60 (second brake assembly 70 in FIG. 7) continues to rotate until the other of the brake bars 76 or 66 engages the other of the tire/tire sets 206 or 204 (FIG. 7). During the rotational displacement 216 of FIG. 7, the force exerted on the bias element 188 is only enough force to overcome the friction and other imperfections of the tow bar-activated brake system 30, including the friction associated with differential rotation of the differential rotation joint 80.

When both brake bars 66 and 76 are set against the treads of the tire/tire sets 204 and 206, the tow bar 32 may not yet be in the parking configuration and the latch member 190 may still be disengaged from the frame 166 (FIG. 7). In this configuration, the tie rod 34 is essentially immobile. Continued raising of the tow bar causes yoke assembly 160 to continue translating the housing 172 of the spring module 170 in the forward direction 102, so that the aperture 184 of the housing 172 slides over the now immobile tie rod 34. As the housing 172 slides forward, the reducing flange 182 of the spring module 170 compresses the biasing element 188 against the head member 186 of the now immobile tie rod 34. The compression of the bias element 188 continues as the tow bar 32 is further rotated into the parking configuration.

Figure 10:
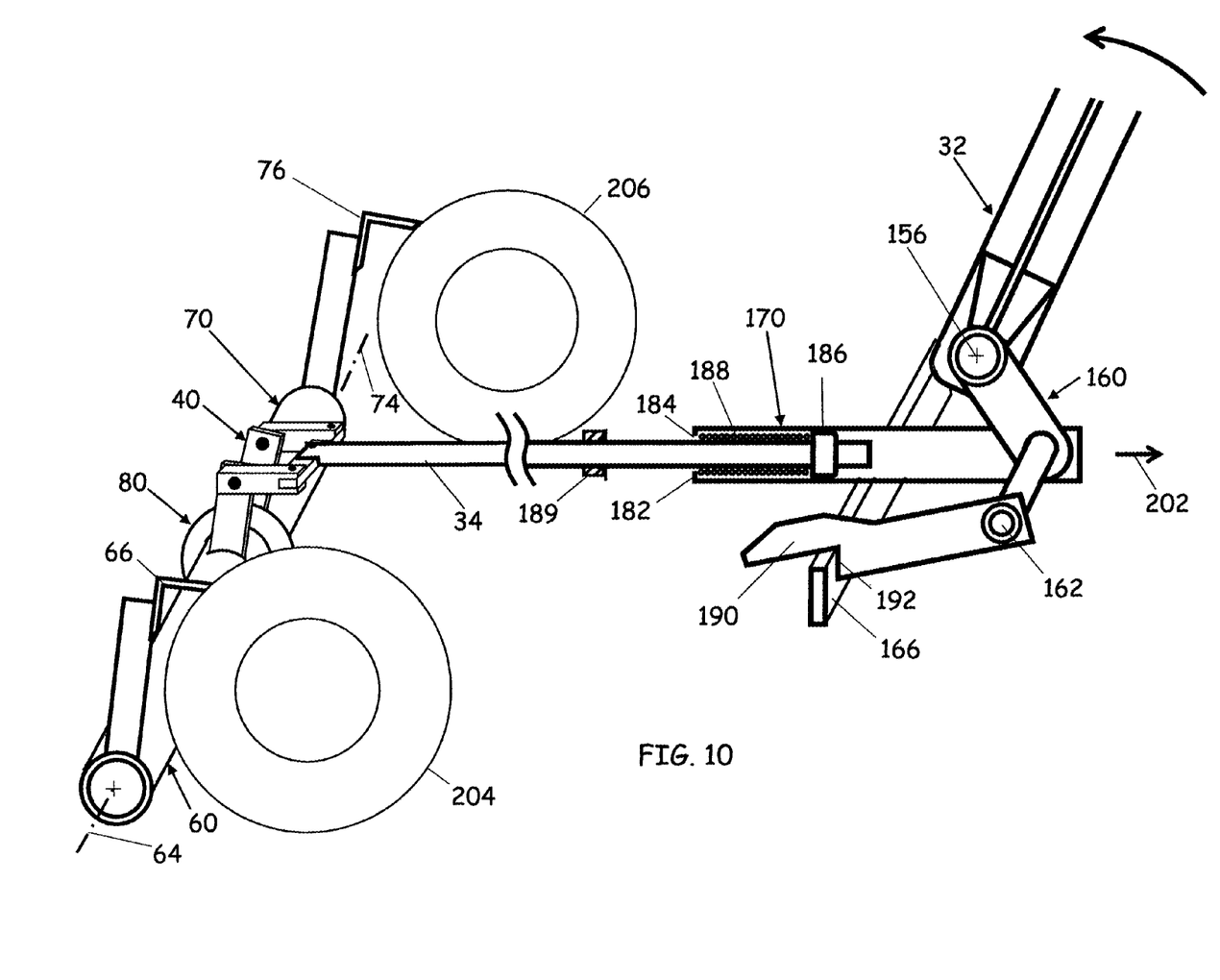
FIG. 10 is a schematic representation of the tow bar-activated brake system of FIG. 1 fully engaged with the tow bar in a locked configuration in an embodiment of the disclosure.

The parking configuration is fully achieved when the hook 192 of the latch member 190 engages the frame 166 (FIG. 10). When in the parking configuration, the compressed biasing element 188 exerts a rearward force on the housing 172, which acts to bias the tow bar 32 toward rotation in the downward position, but is prevented from going into the downward position by the engaged latch member 190.

The latch 190 can be released by forcing the tow bar 32 slightly past the parking configuration, which disengages the hook 192 from the frame 166. The latch 190 can then be rotate upward so that the hook 192 slides over the frame 166. The tow bar 132 is then free to rotate downward into the towing configuration. When the tow bar 32 is lowered, the off center rotation of the yoke assembly 160 causes the housing 172 of the spring module 170 to exert a rearward force against the stop 189, thereby causing the brake assemblies 60 and 70 to disengage from the tires/tire sets 204 and 206 and to maintain the disengagement.

Functionally, spring module 170 serves three purposes. First, the spring module 170 enables the length of the stroke of the tie rod 34 in the forward direction 102 to vary, which may happen over time as the tires/tire sets 204, 206 wear, or as different tires/tire sets 204, 206 are substituted into the system. Second, the biasing force exerted by the compression of the biasing element 188 positively sets the latch member 190 against the frame 166 for a more secure engagement. Third, when the tow bar 32 is in the towing or downward configuration, the spring module 170 cooperates with the stop 189 to maintain the brake assemblies 60 and 70 in disengagement from the tires/tire sets 204 and 206.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant art will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

References to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:

1. A tow bar-activated brake system for a towed vehicle, comprising:
   a tow bar adapted to rotate from a towing configuration to a parking configuration;
   a first brake assembly including a first axle defining a first rotation axis and a first brake bar offset from said first rotation axis for contacting a tread of a first tire of said towed vehicle, said first brake assembly being operatively coupled with said tow bar for rotation of said first axle about said first rotation axis; and a second brake assembly including a second axle defining a second rotation axis and a second brake bar offset from said second rotation axis for contacting a tread of a second tire of said towed vehicle, said second brake assembly being operatively coupled with said tow bar for rotation of said second axle about said second rotation axis, wherein said second rotation axis is concentric with said first rotation axis, wherein said second axle is configured for rotation about said second rotation axis independent of said first axle.

2. The tow bar-activated brake system of claim 1, comprising:

a tie rod having a first end coupled to said tow bar;

a linkage assembly pivotally connected to a second end of said tie rod, said linkage assembly including a cross member, a first linkage, and a second linkage, said first linkage being pivotally mounted to said cross member about a first pivot, and second linkage being mounted to said cross member about a second pivot, said second pivot being laterally spaced from said first pivot;

a first standoff affixed to said first axle and pivotally connected to said first linkage; and a second standoff affixed to said second axle and pivotally connected to said second linkage.

3. The tow bar-activated brake assembly of claim 1, wherein a first flange is coupled to said first axle and is concentric about said first axis, and a second flange is coupled to said second axle and is concentric about said second rotational axis, said second flange being connected to said first flange, said second flange being configured to rotate about said second rotational axis relative to said first flange.

4. The tow bar-activated brake assembly of claim 3, wherein said first axle and said second axle are operatively coupled to a shaft, said shaft being in fixed rotational relation to said first axle and rotatable within said second axle.

5. The tow bar-activated brake assembly of claim 4, wherein said first brake assembly is connected to said second brake assembly.

6. The tow bar-activated brake assembly of claim 3, further comprising a thrust bearing disposed interstitially between said first flange and said second flange.

7. The tow bar-activated brake assembly of claim 3, further comprising a shim disposed interstitially between said first flange and said second flange.

8. The tow bar-activated brake assembly of claim 7, wherein said shim comprises one of a low friction material and a self-lubricating material.

9. The tow bar activated brake assembly of claim 3, comprising a plurality of fasteners coupled in rotationally fixed relation to said first flange, said second flange defining a plurality of arcuate slots, each of said plurality of arcuate slots corresponding to one of said plurality of fasteners and through which said fixed fasteners extend, said arcuate slots and said fasteners being configured to secure said first flange to said second flange while enabling said first flange to rotate about said second axis relative to said first flange.

10. The tow bar-activated brake assembly of claim 9, further comprising one of a shim and a thrust bearing disposed interstitially between said first flange and said second flange, said one of said shim and said thrust bearing being coupled with said fasteners in a rotationally fixed relation.

11. The tow bar-activated brake assembly of claim 5, further comprising a plurality of bushings, each of said plurality of bushings corresponding to one of said plurality of fasteners, said bushings being dimensioned to maintain spacing between said first flange and said second flange that enables differential rotation therebetween about said first axis and said second axis.

12. The tow bar-activated brake assembly of claim 2, further comprising a latch assembly that engages a frame of said towed vehicle to secure said tow bar in said parking configuration.

13. The tow bar-activated brake assembly of claim 12, further comprising a spring module configured to exert a biasing force between said tie rod and said tow bar to secure said latch to said frame when said tow bar is in said parking configuration.

14. The tow bar-activated brake assembly of claim 13, further comprising a stop affixed to said tie rod, wherein said spring module is configured to engage said stop for disengagement of said first brake assembly from said tread of said first tire and for disengagement of said second brake assembly from said tread of said second tire when said tow bar is in said towing configuration.

15. A method for braking a towed vehicle, comprising:

rotating a first axle of a first brake assembly through a first rotational displacement and into contact with a tread of a first tire of a towed vehicle; and rotating a second axle of a second brake assembly through a second rotational displacement and into contact with a tread of a second tire of a towed vehicle, wherein said second rotational displacement is greater than said first rotational displacement.

16. The method of claim 15, comprising coupling said first axle to said second axle at a differential rotational displacement joint to enable said second rotational displacement being greater than said first rotational displacement.

17. The method of claim 16, comprising:

coupling a first linkage of a linkage assembly to said first brake assembly;

coupling a second linkage of said linkage assembly to said second brake assembly; and translating said linkage assembly for the step of rotating said first axle and for the step of rotating said second axle.

18. The method of claim 17, comprising:

coupling a tow bar to said linkage assembly; and rotating said tow bar into a parking configuration for the step of translating said linkage assembly.

19. The method of claim 18, comprising engaging a latch of said tow bar with a frame of said towed vehicle to maintain said tow bar in said parking configuration.

20. The method of claim 19, comprising biasing said tow bar when in said parking configuration to maintain engagement of said latch with said frame.

* * * * *